United States Patent

Haynes et al.

(10) Patent No.: US 10,787,269 B2
(45) Date of Patent: Sep. 29, 2020

(54) AUTOMATIC RETRACTING FIRING CABLE

(71) Applicant: GOODRICH CORPORATION, Charlotte, NC (US)

(72) Inventors: Timothy C. Haynes, Prescott Valley, AZ (US); Michael A. Luzader, Laveen, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 140 days.

(21) Appl. No.: 15/862,233

(22) Filed: Jan. 4, 2018

(65) Prior Publication Data

US 2019/0202571 A1 Jul. 4, 2019

(51) Int. Cl.
*B64D 25/14* (2006.01)

(52) U.S. Cl.
CPC .................... *B64D 25/14* (2013.01)

(58) Field of Classification Search
CPC ........ B64D 25/14; B64D 25/00; B64D 25/18; F42C 15/00; F16K 31/46; F16K 31/56; F16K 31/44
See application file for complete search history.

(56) References Cited

U.S. PATENT DOCUMENTS

| | | | | |
|---|---|---|---|---|
| 2,051,316 A * | 8/1936 | Shaw | ....................... | H01B 7/06 174/69 |
| 2,942,816 A * | 6/1960 | Dostie | .................... | B64D 25/00 244/137.2 |
| 3,139,794 A * | 7/1964 | Barnes, Jr. | ................ | F41F 3/04 89/1.818 |
| 3,554,344 A * | 1/1971 | Summer | ................ | B64D 25/14 193/25 B |
| 3,782,413 A * | 1/1974 | Chacko | ................... | F16K 35/00 137/223 |
| 4,328,714 A * | 5/1982 | Spinosa | ................ | B64D 25/00 116/200 |
| 5,586,615 A * | 12/1996 | Hammer | ................... | A62B 1/20 182/48 |
| 5,871,180 A * | 2/1999 | Hublikar | ............... | B64D 25/14 193/25 B |
| 5,909,921 A * | 6/1999 | Nesbeth | ................ | B60J 7/1621 296/100.06 |

(Continued)

FOREIGN PATENT DOCUMENTS

GB 1389591 A * 4/1975 ............. B63B 27/28

*Primary Examiner* — Katherine W Mitchell
*Assistant Examiner* — Candace L Bradford
(74) *Attorney, Agent, or Firm* — Snell & Wilmer LLP

(57) ABSTRACT

An evacuation system includes an inflatable device, and a charged cylinder configured to store a compressed gas. The evacuation system further includes an aspirator configured to receive the compressed gas and to inflate the inflatable device in response to receiving the compressed gas. The evacuation system further includes a firing cable having a maximum length and an elastic component configured to cause the firing cable to have an at-rest length that is less than the maximum length in response to a lack of force applied to the firing cable, the firing cable being coupled to the charged cylinder and configured to cause the charged cylinder to release the compressed gas in response to sufficient force being applied to the charged cylinder via the firing cable.

20 Claims, 6 Drawing Sheets

(56) References Cited

U.S. PATENT DOCUMENTS

| | | | | |
|---|---|---|---|---|
| 6,233,796 B1* | 5/2001 | van Wassenhove | ..... | D03D 3/02 |
| | | | | 28/100 |
| 6,769,647 B2* | 8/2004 | Moro | ..... | B64D 25/14 |
| | | | | 244/137.2 |
| 6,877,698 B2* | 4/2005 | Baker | ..... | B64D 25/14 |
| | | | | 182/48 |
| 8,250,980 B1* | 8/2012 | Mackie-Smith | ..... | F42C 7/12 |
| | | | | 102/204 |
| 8,967,066 B1* | 3/2015 | Bekey | ..... | B63B 21/00 |
| | | | | 114/230.24 |
| 2006/0043763 A1* | 3/2006 | Berklich, Jr. | ..... | E05F 15/622 |
| | | | | 296/146.4 |
| 2006/0080808 A1* | 4/2006 | Bishop | ..... | H02G 11/00 |
| | | | | 24/115 R |
| 2007/0186837 A1* | 8/2007 | Bagley | ..... | B63G 8/22 |
| | | | | 114/333 |
| 2018/0339779 A1* | 11/2018 | Bahena | ..... | B64D 25/14 |
| 2019/0106219 A1* | 4/2019 | Parker | ..... | B64D 25/00 |
| 2019/0202571 A1* | 7/2019 | Haynes | ..... | B64D 25/14 |

* cited by examiner

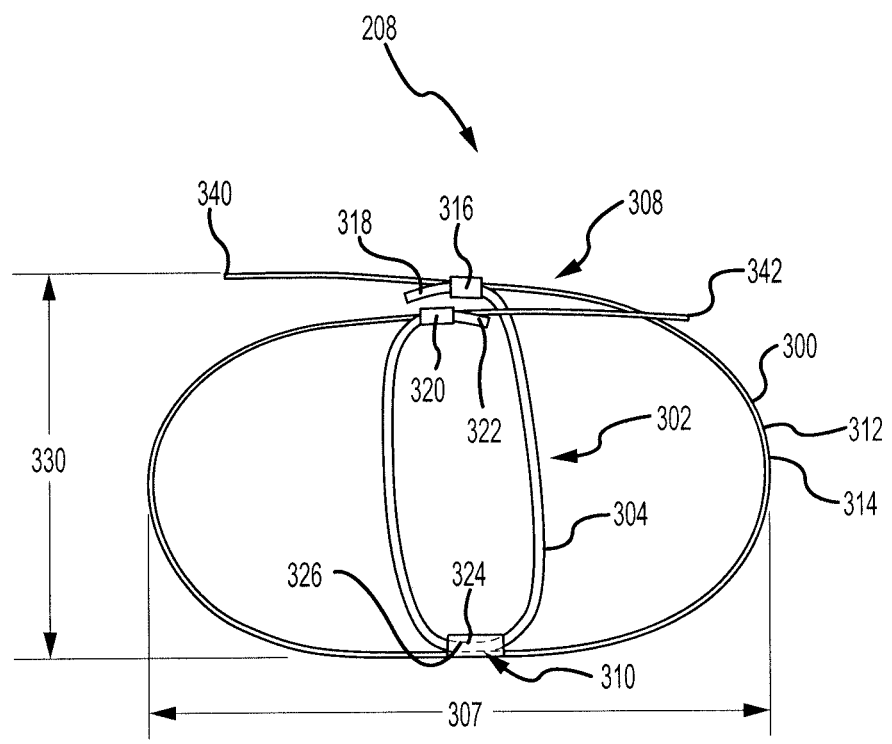
FIG.4A
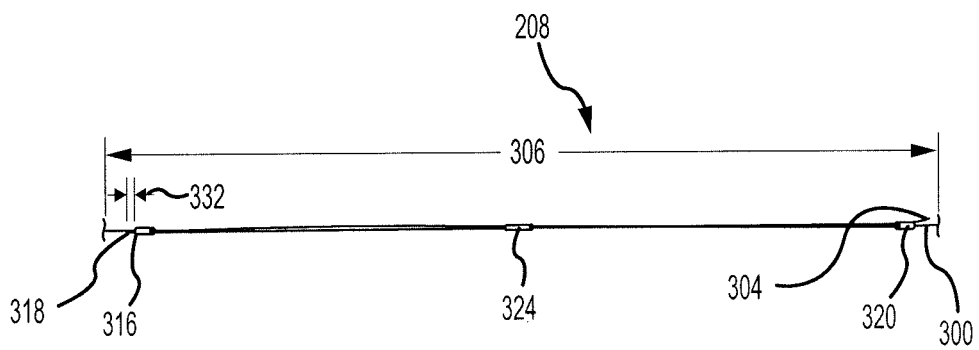
FIG.4B
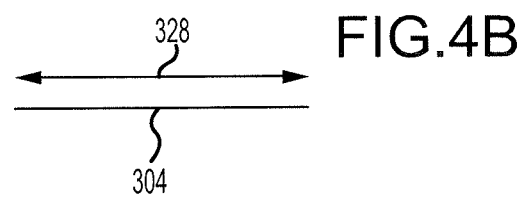

AUTOMATIC RETRACTING FIRING CABLE

FIELD

The present disclosure is directed to an evacuation system and, more particularly, to an evacuation system having a firing cable with an elastic component.

BACKGROUND

Aircraft may include evacuation systems that facilitate evacuation of passengers in various situations. Such evacuation systems may include inflatable devices that may be used as at least one of a slide to exit the aircraft or a flotation device separate from the aircraft. The evacuation systems may include features that facilitate relatively rapid inflation of the inflatable devices. For example, a charged cylinder may provide a flow of fluid to an aspirator which may cause the aspirator to draw air from the environment and into the inflatable device.

SUMMARY

Described herein is an evacuation system. The evacuation system includes an inflatable device, and a charged cylinder configured to store a compressed gas. The evacuation system further includes an aspirator configured to receive the compressed gas and to inflate the inflatable device in response to receiving the compressed gas. The evacuation system further includes a firing cable having a maximum length and an elastic component configured to cause the firing cable to have an at-rest length that is less than the maximum length in response to a lack of force applied to the firing cable, the firing cable being coupled to the charged cylinder and configured to cause the charged cylinder to release the compressed gas in response to sufficient force being applied to the charged cylinder via the firing cable.

In any of the foregoing embodiments, the elastic component allows the firing cable to extend to the maximum length in response to sufficient force being applied to the firing cable.

In any of the foregoing embodiments, the firing cable further includes a cable portion and the elastic component includes an elastic member coupled to the cable portion.

In any of the foregoing embodiments, the elastic member is coupled to the cable portion such that the cable portion forms at least one loop in response to a lack of tensile force being applied to the firing cable.

In any of the foregoing embodiments, the elastic member is coupled to the cable portion via crimping.

In any of the foregoing embodiments, the elastic member includes at least one of elasticized polyester webbing or a military specified elastic cord.

In any of the foregoing embodiments, the elastic member at least partially surrounds the cable portion as a sheath.

In any of the foregoing embodiments, the cable portion is at least partially woven through the elastic member.

In any of the foregoing embodiments, the elastic component includes a spring.

Also disclosed is an evacuation system. The evacuation system includes an inflatable device, and a charged cylinder configured to store a compressed gas. The evacuation system also includes an aspirator configured to receive the compressed gas and to inflate the inflatable device in response to receiving the compressed gas. The evacuation system also includes a firing cable having a cable portion having a maximum length and an elastic member configured to apply a compressive force to the cable portion, the cable portion being coupled to the charged cylinder and configured to cause the charged cylinder to release the compressed gas in response to force being applied to the charged cylinder via the cable portion.

In any of the foregoing embodiments, the elastic member is coupled to the cable portion such that the cable portion forms at least one loop in response to a lack of tensile force being applied to the firing cable.

In any of the foregoing embodiments, the elastic member is coupled to the cable portion via crimping.

In any of the foregoing embodiments, the elastic member includes at least one of elasticized polyester webbing or a military specified elastic cord.

In any of the foregoing embodiments, the elastic member at least partially surrounds the cable portion as a sheath.

In any of the foregoing embodiments, the cable portion is at least partially woven through the elastic member.

In any of the foregoing embodiments, the cable portion includes a steel.

In any of the foregoing embodiments, the elastic member allows the cable portion to extend to the maximum length in response to sufficient force being applied to the cable portion.

Also disclosed is an evacuation system. The evacuation system includes an inflatable device, and a charged cylinder configured to store a compressed gas. The evacuation system further includes an aspirator configured to receive the compressed gas and to inflate the inflatable device in response to receiving the compressed gas. The evacuation system also includes a firing cable having a cable portion having a maximum length and an elastic member crimped to the cable portion and configured to resist extension of the cable portion, the cable portion being coupled to the charged cylinder and configured to cause the charged cylinder to release the compressed gas in response to force being applied to the charged cylinder via the cable portion.

In any of the foregoing embodiments, the elastic member is crimped to the cable portion in at least two locations such that the elastic member causes the cable portion to form at least one loop in response to a lack of tensile force being applied to the cable portion.

In any of the foregoing embodiments, the elastic member includes at least one of elasticized polyester webbing or a military specified elastic cord and the cable portion includes a steel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIGS. 4A and 4B illustrate the firing cable of FIG. 3 in an at-rest position and an extended position, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the disclosure, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
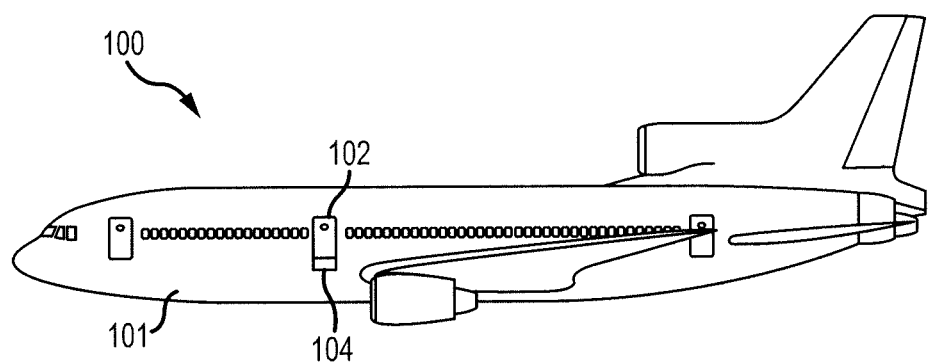
FIG. 1 illustrates an aircraft having an exit door and an evacuation system, in accordance with various embodiments.

Referring now to FIG. 1, an aircraft 100 is shown. The aircraft 100 may include a fuselage 101 having plurality of exit doors including an exit door 102. The aircraft 100 may include one or more evacuation systems positioned near a corresponding exit door. For example, the aircraft 100 includes an evacuation system 104 positioned near the exit door 102. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member, such as pulling of a firing cable.

Figure 2:
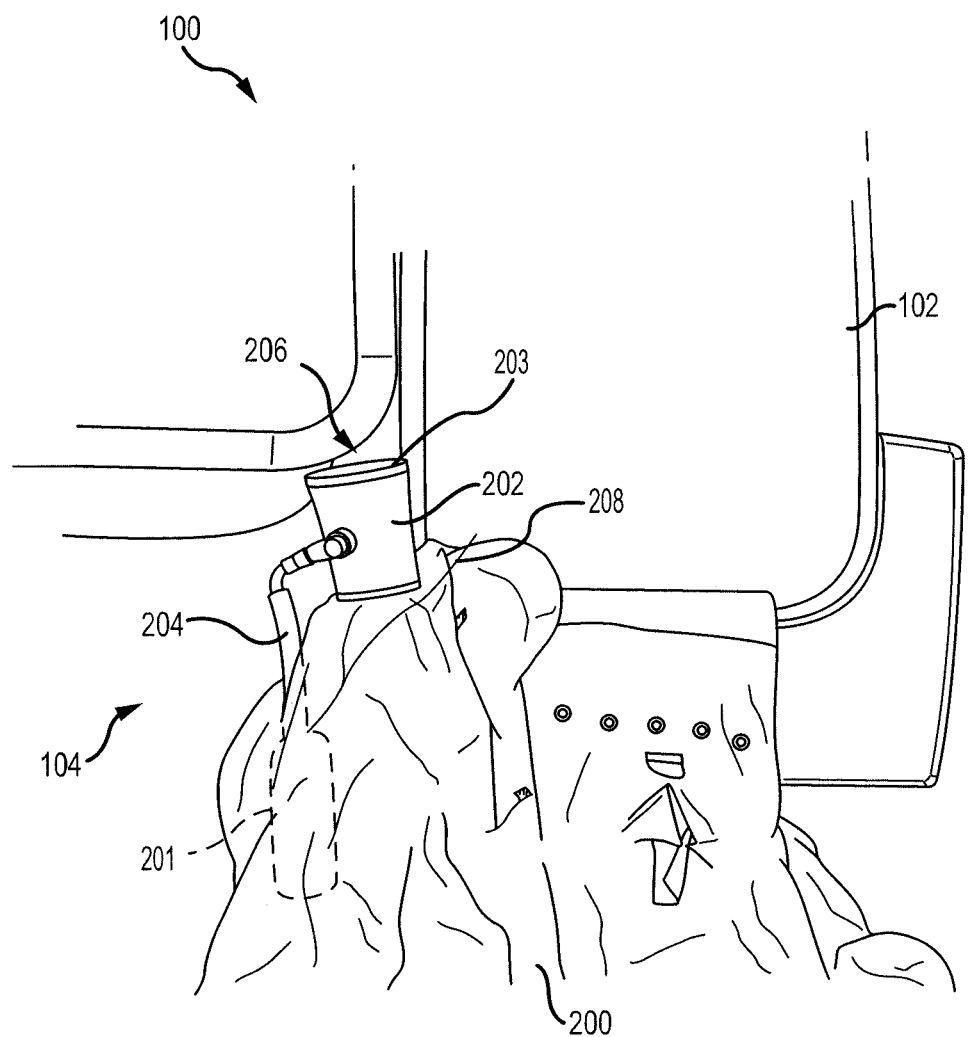
FIG. 2 illustrates various features of the evacuation system of FIG. 1 including an inflatable device, in accordance with various embodiments.
Figure 3:
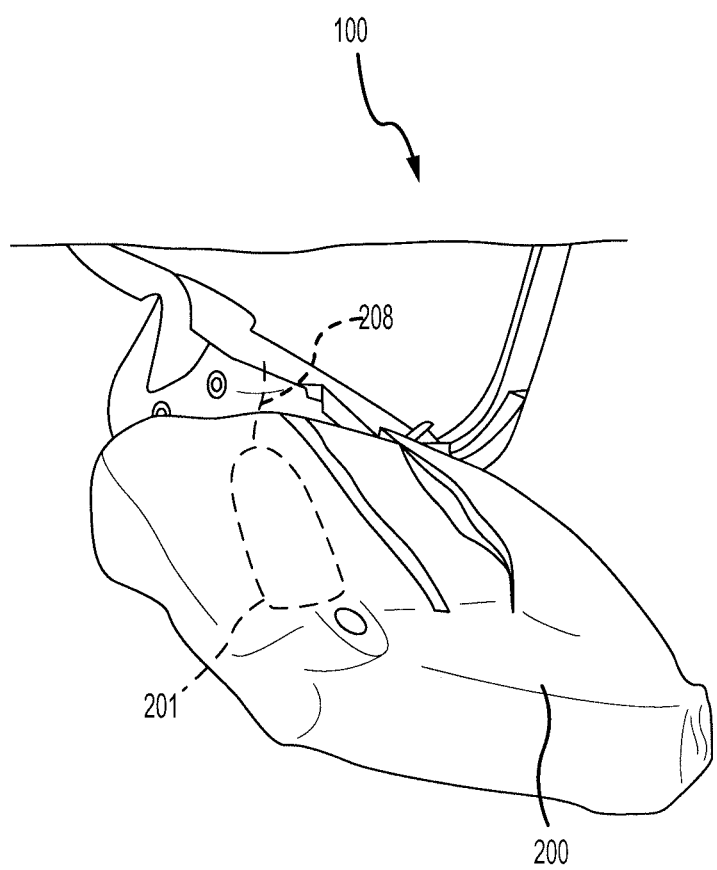
FIG. 3 illustrates various features of the evacuation system of FIG. 1 including a charged cylinder and a firing cable, in accordance with various embodiments.

Turning to FIGS. 2 and 3, additional details of the evacuation system 104 are illustrated. In particular, the evacuation system 104 includes an inflatable device 200. The evacuation system 104 further includes a source of forced gas 206. The source of forced gas 206 may cause a gas to enter the inflatable device 200 to inflate the inflatable device 200. The inflatable device 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable device 200 may be permanently coupled to the fuselage 101. In various embodiments, the inflatable device 200 may function as a slide from the fuselage 101 to a ground surface upon which the aircraft 100 is resting.

The source of forced gas 206 may include an aspirator 202 coupled to the inflatable device 200, piping 204 coupled to the aspirator 202, and a charged cylinder 201 coupled to the piping 204. The charged cylinder 201 may store a compressed gas.

Under normal operating conditions, the inflatable device 200 may be deflated and stored within a compartment of the aircraft 100. In various embodiments, at least one of the inflatable device 200, the aspirator 202, or the charged cylinder 201 may be stored in a single package within the aircraft compartment. In response to deployment of the evacuation system 104, the charged cylinder 201 may release the compressed gas, causing fluid to flow into the aspirator 202 from the charged cylinder 201 via the piping 204 at a relatively high velocity. This fluid flow may cause the aspirator 202 to draw gas (such as air) from the environment. The fluid flow (such as in a gaseous state) and the environmental gas may be directed into the inflatable device 200. In response to receiving the fluid flow and the environmental gas, the inflatable device 200 may begin to inflate.

The evacuation system 100 may include a firing cable 208. The firing cable 208 may be coupled to the charged cylinder 201. In various embodiments, a force may be applied to the charged cylinder 201 via the firing cable 208. For example, an operator may pull or otherwise exert an tensile force on the firing cable 208, which translates through the firing cable 208 to the charged cylinder 201. Where used in this context, tensile force refers to a force in which two ends of an object (such as the firing cable 208) are forced apart from each other. In response to sufficient force being applied to the charged cylinder 201 via the firing cable 208 (i.e., in response to sufficient tensile force applied to the firing cable 208), the charged cylinder 201 may release the compressed gas to begin inflation of the inflatable device 200. For example, the sufficient force may be an amount of tensile force sufficient to remove a plug from a seat. For example, in response to the sufficient force, a plug may be removed from the charged cylinder 201, allowing the gas to flow from the charged cylinder 201 into the aspirator 202.

In various embodiments, it may be desirable for the firing cable 208 to be spaced apart from the aspirator 202 while the aspirator 202 is drawing air from the environment, because it may be undesirable for the firing cable 208 to be received by an inlet 203 of the aspirator 202.

In that regard and referring to FIGS. 2, 4A and 4B, the firing cable 208 may have a maximum length 306. In response to the firing cable 208 being extended to the maximum length 306, the firing cable 208 may reach the inlet 203 of the aspirator 206. In that regard, the firing cable 208 may include an elastic component 302. The elastic component 302 may resist the extension of the firing cable 208 to the maximum length 306. Stated differently, the elastic component 302 may exert a compressive force on the firing cable 208 to cause the firing cable 208 to have an at-rest length 307 that is less than the maximum length 306 in response to a lack of tensile force being applied to the firing cable 208 (i.e., in an at rest state). In that regard, the at-rest length 307 may also be referred to as a lesser length 307. The firing cable 208 may be unable to reach the inlet 203 of the aspirator in response to a lack of tensile force (i.e., in response to the firing cable having the at-rest length 307).

In various embodiments and referring to FIGS. 4A and 4B, the firing cable 208 may include a cable portion 300 and the elastic component 302. In various embodiments, the elastic component 302 may be an elastic member 304 coupled to the cable portion 300. With brief reference to FIGS. 3 and 4A, the cable portion 300 may be the portion that is coupled to the charged cylinder 201. In that regard, an operator may begin inflation of the inflatable device 200 by exerting a tensile force on the cable portion 300 (i.e., pulling on a first end 340 of the cable portion 300 in a direction away from a second end 342 of the cable portion 300).

Returning reference to FIGS. 4A and 4B and in various embodiments, the cable portion 300 may include a metal 312, such as a stainless steel. In various embodiments, the cable portion 300 may further include a jacket 314 surrounding the metal 312. In various embodiments, the jacket 314 may include a natural or synthetic material such as nylon, polypropylene, polytetrafluorethylene, polyether ether ketone, or the like.

In various embodiments, the elastic member 304 may include any elastic material. For example, the elastic member 304 may include at least one of elasticized polyester webbing or a military specified elastic cord (such as an elastic cord that meets a certain specification, such as the MIL-C-5651D specification, available from Elastic Cord and Webbing, Inc. of East Dundee, Ill.)

In various embodiments, the maximum length 306 of the cable portion 300 may be between 10 inches and 50 inches (25.4 centimeters (cm) and 127 cm), between 20 inches and 40 inches (50.8 cm and 102 cm), or about 29 inches (73.7 cm). Where used in this context, about refers to the referenced value plus or minus 10 percent (10%) of the referenced value.

In various embodiments, the elastic member 304 may have an at-rest length 328 (i.e., a length in response to a lack of tensile force applied to the firing cable 208) that is less than the maximum length 306 of the cable portion 300. For example, the at-rest length 328 may be between 5 inches and 30 inches (12.7 cm and 76.2 cm), between 7 inches and 20 inches (17.8 cm and 50.8 cm), or about 13.5 inches (34.29 cm).

In various embodiments, the elastic member 304 may be coupled to the cable portion 304 in such a manner as to cause the cable portion 304 to form at least one loop 308. In various embodiments, the at-rest length 307 of the firing cable 208 (i.e., when the firing cable 208 forms the loop 308, or in response to a lack of tensile force applied to the firing cable 208) may be between 5 inches and 15 inches (12.7 cm and 38.1 cm), between 7 inches and 10 inches (17.8 cm and 25.4 cm), or about 8.75 inches (22.23 cm).

In various embodiments, an at-rest width 330 of the firing cable 208 (i.e., in response to a lack of tensile force applied to the firing cable 208) may be between 1 inch and 10 inches (2.54 cm and 25.4 cm), between 3 inches and 7 inches (7.6 cm and 17.8 cm), or about 5 inches (12.7 cm).

In various embodiments, the elastic member 304 may be coupled to the cable portion 300 via crimps 310. The firing cable 208 may include any quantity of crimps 310. For example, the elastic member 304 may be coupled to the cable portion 300 using a $1^{st}$ crimp 316 at or near a $1^{st}$ end 318 of the elastic member 304, a $2^{nd}$ crimp 320 at or near a $2^{nd}$ end 322 of the elastic member 304, and a third crimp 324 at or near a third location 326 that is halfway between the $1^{st}$ end 318 and the $2^{nd}$ end 322. Where used in this context, the term "near" may refer to any location that is between the location and 5% away from the location, or between the location and 10% away from the location, or between the location and 20% away from the location. For example, the $1^{st}$ crimp 316 may be located a distance 332 from the $1^{st}$ end 318, and the distance 332 may be any distance that is between the first end 318 and 20% of the length 328 of the elastic member 304 away from the first end 318.

Figure 5:
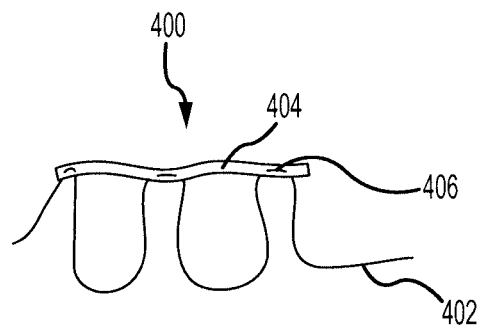
FIG. 5 illustrates a firing cable having a cable portion woven through an elastic member, in accordance with various embodiments.

Referring now to FIG. 5, another firing cable 400 is shown. The firing cable 400 includes a cable portion 402 and an elastic member 404. As shown in FIG. 5, the cable portion 402 is partially woven through the elastic member 404. For example, the cable portion 402 may form a weave 406 with the elastic member 404. In that regard, the elastic member 404 may include a mesh or other such structure that facilitates weaving of the cable 402 through the elastic member 404.

Figure 6A:
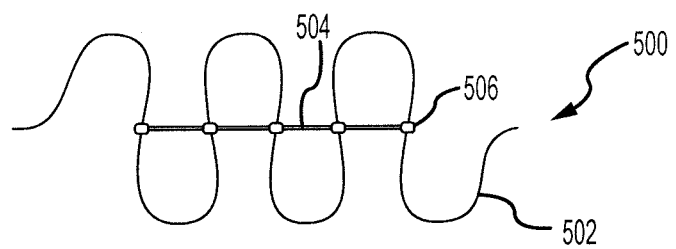
FIGS. 6A and 6B illustrate a firing cable having an elastic member crimped to a cable portion, in accordance with various embodiments.
Figure 6B:
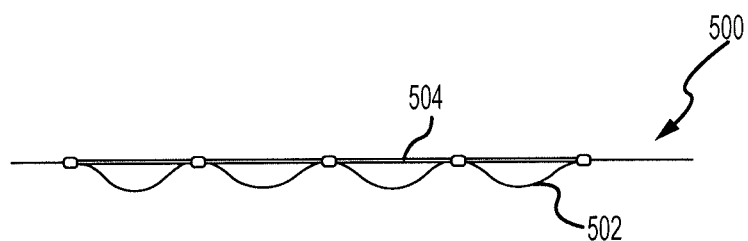

Turning to FIGS. 6A and 6B, another firing cable 500 is shown. The firing cable 500 includes a cable portion 502 and an elastic member 504. The elastic member 504 is coupled to the cable portion 502 via crimps 506. In particular, the firing cable 500 includes five crimps 506. As shown in FIG. 6A, the elastic member 504 is coupled to the cable portion 502 in such a manner as to cause the cable portion 502 to resemble a sine wave in an at-rest position (i.e., in response to a lack of tensile force being applied to the firing cable 500).

Figure 7A:
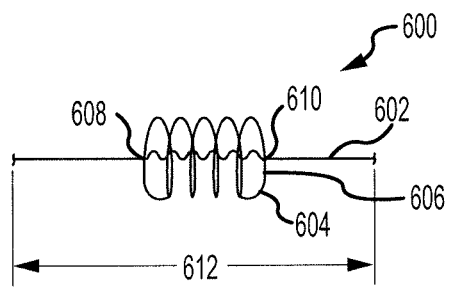
FIGS. 7A and 7B illustrate a firing cable having a compression spring coupled to a cable portion, in accordance with various embodiments.
Figure 7B:
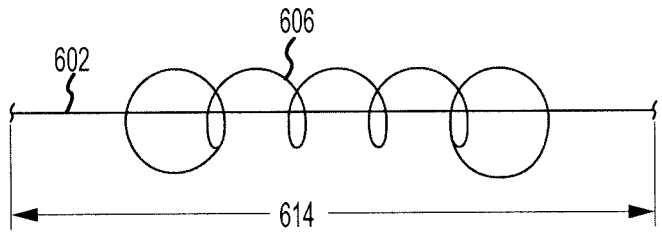

Turning now to FIGS. 7A and 7B, another firing cable 600 is shown. The firing cable 600 includes a cable portion 602 and an elastic component 604. In particular, the elastic component 604 includes a spring 606. The spring 606 may include any spring, such as a compression spring, that applies a compressive force to the cable portion 602. The spring 606 may be coupled to the cable portion 602 at a $1^{st}$ location 608 and a $2^{nd}$ location 610.

In response to a lack of tensile force applied to the cable portion 602 (i.e., in an at-rest position), the firing cable 600 may have a $1^{st}$ length 612 due to the compressive force of the spring 606. In response to tensile force being applied to the cable portion 602, the spring 606 may extend such that the firing cable 600 has a $2^{nd}$ length 614 that is greater than the $1^{st}$ length 612.

Figure 8A:
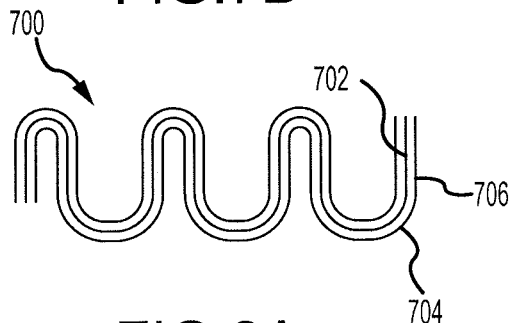
FIGS. 8A and 8B illustrate a firing cable having an elastic member that operates as a sheath for a cable portion, in accordance with various embodiments.
Figure 8B:
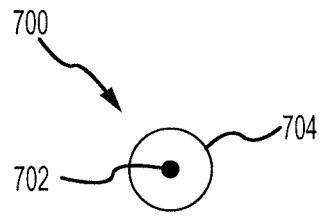

Turning now to FIGS. 8A and 8B, another firing cable 700 is shown. The firing cable 700 includes a cable portion 702 and an elastic member 704. The elastic member 704 may at least partially enclose the cable portion 702 and may thus operate as a sheath 706. The elastic member 704 may apply a compressive force to the cable portion 702 such that the firing cable 700 may extend in length in response to a tensile force being applied to the firing cable 700.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An evacuation system, comprising:
an inflatable device;
a charged cylinder configured to store a compressed gas;
an aspirator configured to receive the compressed gas and having an inlet configured to receive a fluid from an environment of the evacuation system in order to inflate the inflatable device in response to receiving the compressed gas; and
a firing cable having a maximum length and an elastic component configured to cause the firing cable to have an at-rest length that is less than the maximum length in response to a lack of force applied to the firing cable, the firing cable being coupled to the charged cylinder and configured to manually actuate, causing the charged cylinder to release the compressed gas in response to sufficient force being applied to the charged cylinder via the firing cable,
wherein the at-rest length of the firing cable is less than a distance from the charged cylinder to the inlet of the aspirator.

2. The evacuation system of claim 1, wherein the elastic component allows the firing cable to extend to the maximum length in response to sufficient force being applied to the firing cable.

3. The evacuation system of claim 1, wherein the firing cable further includes a cable portion and the elastic component includes an elastic member coupled to the cable portion.

4. The evacuation system of claim 3, wherein the elastic member is coupled to the cable portion such that the cable portion forms at least one loop in response to a lack of tensile force being applied to the firing cable.

5. The evacuation system of claim 3, wherein the elastic member is coupled to the cable portion via crimping.

6. The evacuation system of claim 3, wherein the elastic member includes at least one of elasticized polyester webbing or a military specified elastic cord.

7. The evacuation system of claim 3, wherein the elastic member at least partially surrounds the cable portion as a sheath.

8. The evacuation system of claim 3, wherein the cable portion is at least partially woven through the elastic member.

9. The evacuation system of claim 1, wherein the elastic component includes a spring.

10. An evacuation system, comprising:
an inflatable device;
a charged cylinder configured to store a compressed gas;
an aspirator configured to receive the compressed gas and having an inlet configured to receive a fluid from an environment of the evacuation system in order to inflate the inflatable device in response to receiving the compressed gas; and
a firing cable having a cable portion having a maximum length and an elastic member configured to apply a compressive force to the cable portion to cause the firing cable to have an at-rest length that is less than the maximum length in response to a lack of force applied to the firing cable, the cable portion being coupled to the charged cylinder and configured to manually actuate, causing the charged cylinder to release the compressed gas in response to force being applied to the charged cylinder via the cable portion,
wherein the at-rest length of the firing cable is less than a distance from the charged cylinder to the inlet of the aspirator.

11. The evacuation system of claim 10, wherein the elastic member is coupled to the cable portion such that the cable portion forms at least one loop in response to a lack of tensile force being applied to the firing cable.

12. The evacuation system of claim 10, wherein the elastic member is coupled to the cable portion via crimping.

13. The evacuation system of claim 10, wherein the elastic member includes at least one of elasticized polyester webbing or a military specified elastic cord.

14. The evacuation system of claim 10, wherein the elastic member at least partially surrounds the cable portion as a sheath.

15. The evacuation system of claim 10, wherein the cable portion is at least partially woven through the elastic member.

16. The evacuation system of claim 10, wherein the cable portion includes a steel.

17. The evacuation system of claim 10, wherein the elastic member allows the cable portion to extend to the maximum length in response to sufficient force being applied to the cable portion.

18. An evacuation system, comprising:
an inflatable device;
a charged cylinder configured to store a compressed gas;
an aspirator configured to receive the compressed gas and having an inlet configured to receive a fluid from an environment of the evacuation system in order to inflate the inflatable device in response to receiving the compressed gas; and
a firing cable having a cable portion having a maximum length and an elastic member crimped to the cable portion and configured to resist extension of the cable portion to cause the firing cable to have an at-rest length that is less than the maximum length in response to a lack of force applied to the firing cable, the cable portion being coupled to the charged cylinder and configured to manually actuate, causing the charged cylinder to release the compressed gas in response to force being applied to the charged cylinder via the cable portion,
wherein the at-rest length of the firing cable is less than a distance from the charged cylinder to the inlet of the aspirator.

19. The evacuation system of claim 18, wherein the elastic member is crimped to the cable portion in at least two locations such that the elastic member causes the cable portion to form at least one loop in response to a lack of tensile force being applied to the cable portion.

20. The evacuation system of claim 18, wherein the elastic member includes at least one of elasticized polyester webbing or a military specified elastic cord and the cable portion includes a steel.

\* \* \* \* \*